United States Patent [19]

Arai et al.

[11] Patent Number: 5,689,627
[45] Date of Patent: Nov. 18, 1997

[54] POLYGON DRAWING AND FILLING APPARATUS WHICH INITIALLY SORTS THREE DIMENSIONAL POLYGONS BY PLANAR CHARACTERISTICS

[75] Inventors: Ikumi Arai; Masafumi Baba, both of Yokohama, Japan

[73] Assignee: Fujitsu Limited, Kawasaki, Japan

[21] Appl. No.: 498,129

[22] Filed: Jul. 5, 1995

[30] Foreign Application Priority Data

Nov. 29, 1994 [JP] Japan ................. 6-295051

[51] Int. Cl.⁶ .................................. G06T 15/00
[52] U.S. Cl. ..................... 395/123; 395/134; 395/501
[58] Field of Search ........................ 395/123, 134, 395/143, 119, 501

[56] References Cited

U.S. PATENT DOCUMENTS

| | | | |
|---|---|---|---|
| 4,962,468 | 10/1990 | Beauregard et al. | 395/129 |
| 5,265,214 | 11/1993 | Nitta | 395/122 |
| 5,276,783 | 1/1994 | Fossum | 365/123 |
| 5,303,340 | 4/1994 | Gonzalez-Lopez et al. | 395/134 |
| 5,335,319 | 8/1994 | Obata | 395/141 |
| 5,347,619 | 9/1994 | Erb | 395/126 |
| 5,357,599 | 10/1994 | Luken | 395/134 |
| 5,581,673 | 12/1996 | Kikucki | 395/123 |

OTHER PUBLICATIONS

Abrash, Michael, "Polygon Primeval (filling polygons)",*Dr. Dobbs*,v17, n2, pp. 153–157, Jan. 1992.
Abrash, Michael, "Fast Convex Polyons",*Dr. Dobbs*,v17, n2, pp., Feb. 1992.

*Primary Examiner*—Mark K. Zimmerman
*Assistant Examiner*—Rudolph Buchel
*Attorney, Agent, or Firm*—Staas & Halsey

[57] ABSTRACT

A polygon drawing apparatus for admitting a figure drawing command including command type data and vertex data defining a polygon to be drawn and for outputting raster data about the polygon. On the basis of the command type of the figure drawing command received from a client, the apparatus judges whether or not the target polygon is a plane figure. When the target polygon is judged to be a plane figure, the apparatus performs such processing as face/reverse determination, coordinate transformation and color computations on the polygon, divides the polygon into a plurality of triangles, and converts each of the divided triangles into raster data. If the target polygon is judged to be a non-planar figure, the apparatus divides the polygon into a plurality of triangles, carries out such processing as face/reverse determination, coordinate transformation and color computations on each of the divided triangles, and converts each triangle into raster data. Because any target plane figures are each subjected to the drawing-related processing without undergoing the dividing process, the apparatus shoulders much less burden in carrying out its processing and performs it at a higher speed than before.

4 Claims, 17 Drawing Sheets

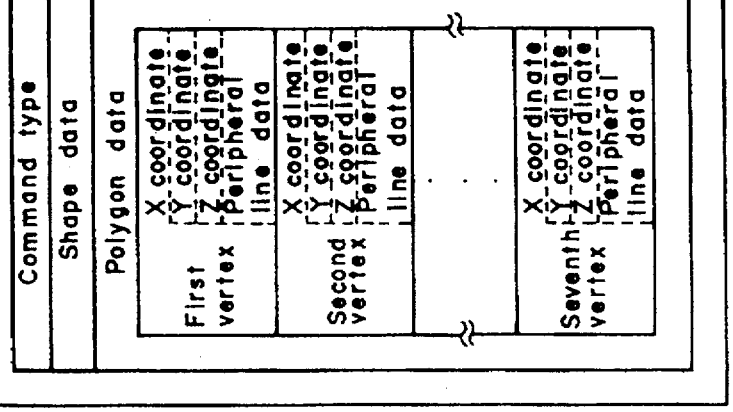
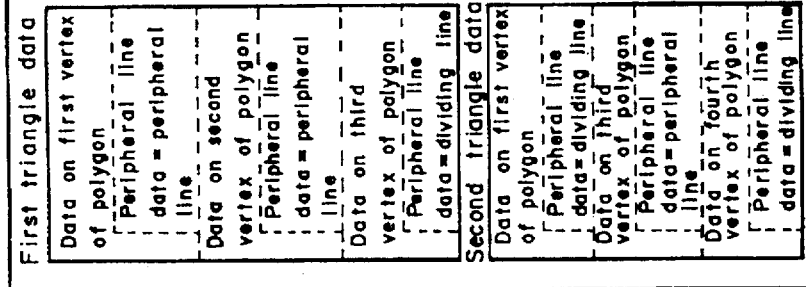
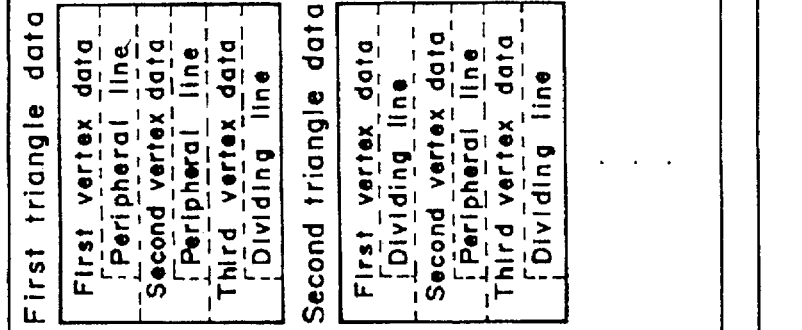

POLYGON DRAWING AND FILLING APPARATUS WHICH INITIALLY SORTS THREE DIMENSIONAL POLYGONS BY PLANAR CHARACTERISTICS

BACKGROUND OF THE INVENTION

1. Field of the Invention

The present invention relates to a polygon drawing apparatus such as a three-dimensional graphic accelerator which receives figure drawing commands composed of three-dimensional polygon defining information (vertex coordinates of the target figure, vertex colors, designated manner of shading, position and color of light source, point of view, etc.) sent from a client such as an application program, and which outputs raster data about the polygon for display on a raster display unit.

2. Description of the Related Art

One typical conventional polygon drawing technique will now be described with reference to some of the accompanying drawings. In FIG. 1, reference numeral 11 indicates a figure drawing command to be input to the conventional polygon drawing apparatus. The figure drawing command 11 provides information that defines the polygon to be processed, and is input from the client such as an application program to the apparatus. The figure drawing command 11 includes, as shown in FIG. 2A, a command type 11a (data for distinguishing this command from other commands), shape data 11b (data about the shape of the target polygon), polygon data 11c (X, Y and Z coordinates of vertices constituting the polygon), vertex colors, designated manner of shading, position and color of a light source, point of view, etc. The figure drawing command 11 is first entered into a polygon dividing unit 12.

The polygon dividing unit 12 divides the target polygon composed of the polygon data 11c contained in the figure drawing command 11 into a plurality of triangles. Following the division, the polygon dividing unit 12 generates polygon vertex data about each of the resulting triangles and places the data into a work memory 13. For example, suppose that the target polygon is a convex pentagon made up of five vertices A, B, C, D and E as shown in FIG. 3A. In that case, the pentagon is divided into a first triangle composed of vertices A, B and C; a second triangle made of vertices A, C and D; and a third triangle with vertices A, D and E, as depicted in FIG. 3B. The polygon dividing unit 12 generates triangle data on each of the first through the third triangle based on their respective three vertices, as indicated in FIG. 2B. The triangle data thus generated is stored into the work memory 13. The polygon dividing unit 12 then transfers to a figure drawing unit 14 the triangle data together with predetermined data constituting the figure drawing command 11. The figure drawing unit 14 has a triangle vertex data processing unit 14a and a triangle drawing unit 14b.

The triangle vertex data processing unit 14a carries out on each transferred triangle such triangle vertex data processing as a face/reverse determining process that determines the orientation of the triangle face (face normal), a coordinate transformation process that transforms the respective polygon vertex data (coordinates) from the originally defined coordinate system to the coordinate system of the apparatus in question, and a color computing process that deals with shading. The triangle vertex data processing unit 14a then places into a work memory 15 a plurality of triangle data made of the vertex data on the first through the third triangle, as shown in FIG. 2C. The triangle drawing unit 14b consecutively transforms into raster data the triangle data provided by the triangle vertex data processing unit 14a. The raster data thus acquired is stored into a frame memory 16. Following storage into the frame memory 16, the raster data is drawn (i.e., displayed) on the raster display unit.

Another conventional polygon drawing technique will now be described with reference to the accompanying drawings. In the description that follows, the component parts with their functionally equivalent counterparts found in the above-described conventional technique will be designated by the same reference numerals and any repetitive description thereof will be omitted. In this example, as shown in FIG. 5A, the figure drawing command 11 has its polygon data 11c supplemented by peripheral line data on each of the vertices in addition to the X, Y and Z coordinates of each vertex. In FIG. 4, the polygon dividing unit 12 includes a division-into-triangle processing unit 12a and a peripheral line data processing unit 12b. The processing unit 12a divides the target polygon composed of the polygon data 11c of the figure drawing command 11 into a plurality of triangles so as to generate polygon vertex data.

The peripheral line data processing unit 12b supplements the data on each polygon vertex with peripheral line data indicating whether the side represented by the vertex in question (e.g., a first vertex may represent the side connecting the first vertex with the second) is a peripheral line (a side constituting part of the periphery of the target polygon) or a dividing line (a side created by division). For example, suppose that the target polygon to be processed is a non-convex heptagon comprising vertices 1 through 7 as shown in FIG. 6A. In that case, the heptagon is divided into a first triangle made of vertices 1, 2 and 3; a second triangle involving vertices 1, 3 and 4; a third triangle comprising vertices 4, 5 and 6; a fourth triangle including vertices 4, 6 and 7; and a fifth triangle having vertices 1, 4 and 7, as depicted in FIG. 6B. For each of the first through the fifth triangle, the peripheral line data processing unit 12b generates triangle data regarding three of the polygon vertices (first, second and third polygon vertex data), as indicated in FIG. 5B. The respective polygon vertex data are each supplemented by peripheral line data before being stored into the work memory 13.

During triangle vertex data processing, the triangle vertex data processing unit 14a of the figure drawing unit 14 supplements each of the respective vertex data with peripheral line data, as shown in FIG. 5C, before placing the data combination into the work memory 15. A peripheral line drawing unit 14c, another component of the figure drawing unit 14, draws the peripheral lines of the target polygon based on the peripheral line data in the respective triangle data processed by the triangle vertex data processing unit 14a.

According to the above-described conventional techniques, the polygon in question is first divided into a plurality of triangles. Each of the triangles is then subjected to such processes as face/reverse determination, coordinate transformation and color computations. Such processes are necessary and effective in drawing the target polygon when that polygon is a non-planar figure. This is because the results of face/reverse determination and color computations vary from one divided triangle to another. On the other hand, if the polygon in question is a plane figure, the determined orientation of the face (face normal) is the same for all divided triangles and so is the result of color computations. Nevertheless, these processes are repeated for all component triangles. In addition, the coordinates of the vertices shared by a plurality of divided triangles are transformed in a duplicate manner. Meanwhile, there are large quantities of data to be transferred from the polygon dividing unit 12 to the figure drawing unit 14. In short, the conventional techniques require carrying out in overlapping fashion many of the steps for processing plane figures. This has made it difficult to draw polygons rapidly and efficiently with the conventional techniques.

SUMMARY OF THE INVENTION

It is therefore an object of the present invention to provide a polygon drawing apparatus capable of drawing polygons in a rapid and efficient manner.

In accordance with an aspect of the present invention, there is provided a polygon drawing apparatus for admitting a figure drawing command including command type data and vertex data defining a polygon to be drawn and for outputting raster data about the polygon. The polygon drawing apparatus comprises: polygon shape analyzing means for judging, based on the command type data of the figure drawing command, whether the polygon constituted by the vertex data of the figure drawing command is a plane figure or a non-planar figure; division-into-triangle processing means for dividing the polygon into a plurality of triangles when the polygon shape analyzing means judges that the polygon is a non-planar figure and for generating vertex data about each of the divided triangles; triangle vertex data processing means for carrying out vertex data processing on each of the divided triangles constituted by the vertex data generated by the division-into-triangle processing means; polygon vertex data processing means for performing the vertex data processing on the polygon when the polygon shape analyzing means judges that the polygon is a plane figure; triangle forming means for dividing into a plurality of triangles the polygon constituted by the vertex data processed by the polygon vertex data processing means and for generating vertex data about each of the divided triangles; and triangle drawing means for successively transforming into raster data each of the triangles constituted by one of two kinds of vertex data, one kind of vertex data having been processed by the triangle vertex data processing means, the other kind of vertex data having been generated by the triangle forming means.

The polygon shape analyzing means of the invention judges, based on the command type data of the figure drawing command, whether the target polygon is a plane figure or a non-planar figure. If the polygon is judged to be a plane figure, the polygon vertex data processing means performs such vertex data processing as face/reverse determination, coordinate transformation and color computations on the original polygon, and then the triangle forming means divides the processed polygon into a plurality of triangles. That is, the plane figure undergoes face/reverse determination and color computations only once and is subject to coordinate transformation just once for each of the vertices making up the polygon. Furthermore, there are less quantities of data to be transferred between different means. With processing loads thus alleviated, the polygon drawing process is carried out rapidly and efficiently.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 5A is a schematic view of a figure drawing command for use with the second conventional polygon drawing apparatus;

FIGS. 5B and 5C are schematic views of data arrangements in work memories of the second conventional polygon drawing apparatus;

DESCRIPTION OF THE PREFERRED EMBODIMENTS

The preferred embodiments of the invention will now be described with reference to the accompanying drawings. In the description that follows and in the appended claims, the term "convex polygon" refers to a polygon of which all internal angles are smaller than 180 degrees each; the non-convex polygon stands for a polygon of which at least one internal angle is greater than 180 degrees; the plane figure signifies a polygonal figure of which all component vertices exist on the same plane; and the non-planar figure is a figure other than the plane figures.

First Embodiment

Figure 1:
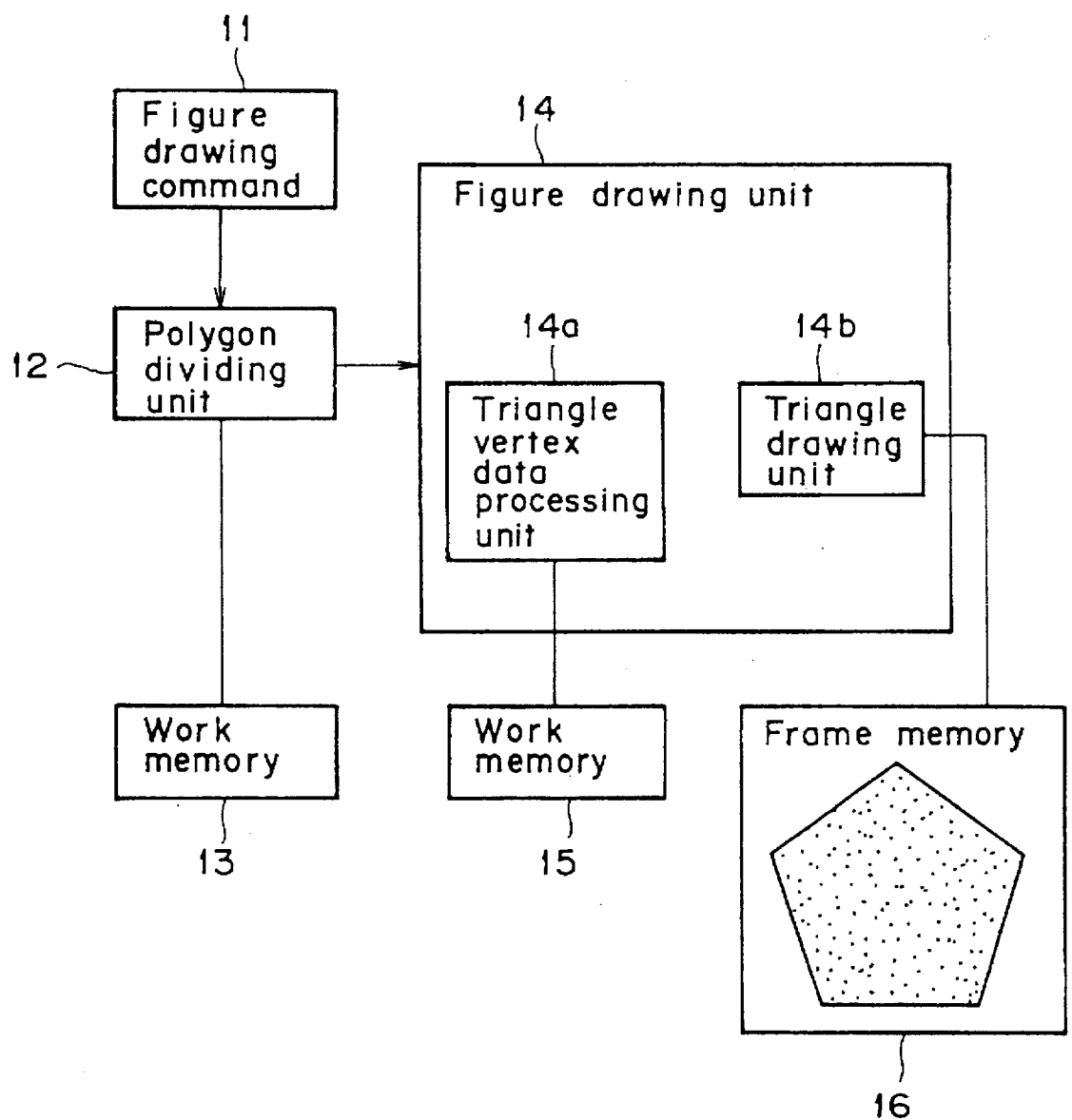
FIG. 1 is a block diagram of a first conventional polygon drawing apparatus.
Figure 2C:
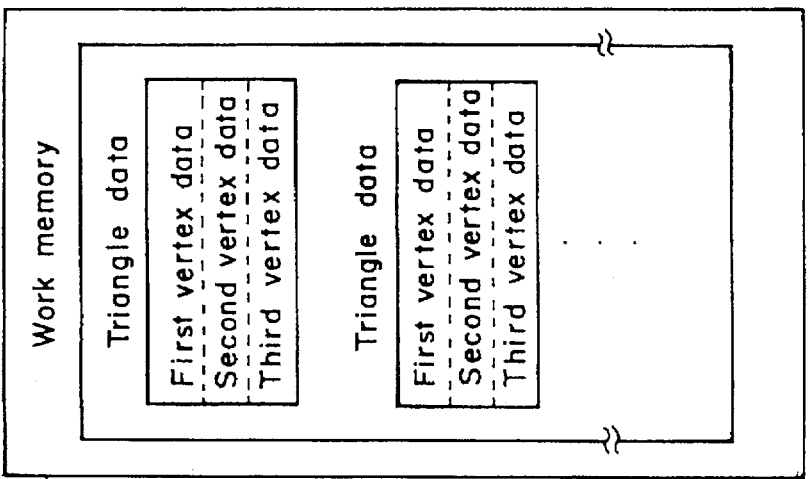
FIGS. 2B and 2C are schematic views of data arrangements in work memories of the first conventional polygon drawing apparatus.
Figure 2B:
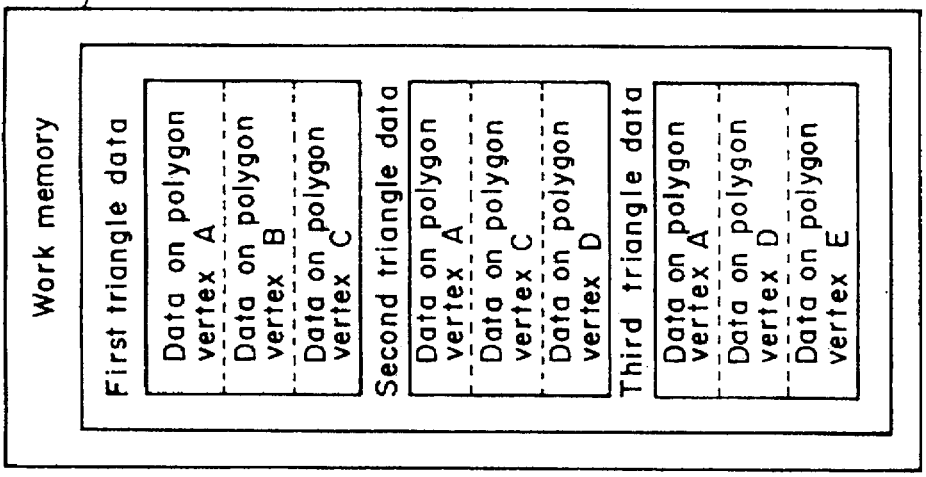
Figure 2A:
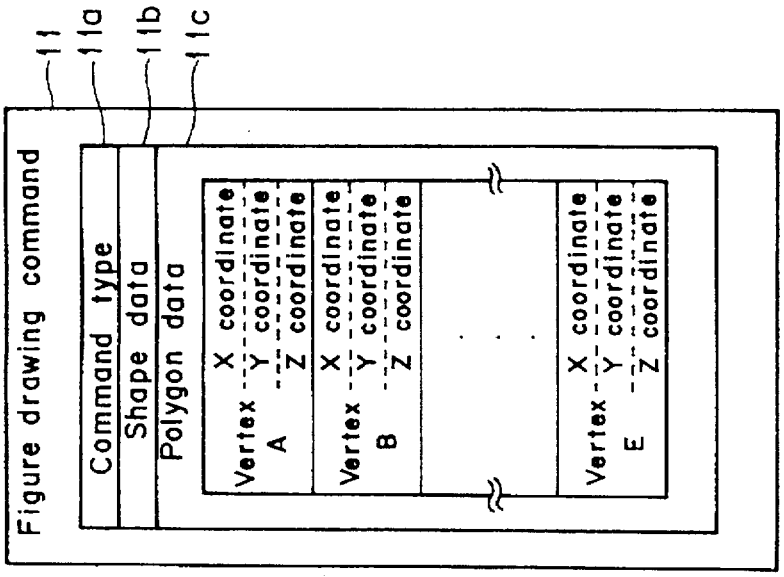
FIG. 2A is a schematic view of a figure drawing command for use with the first conventional polygon drawing apparatus.
Figure 3A:
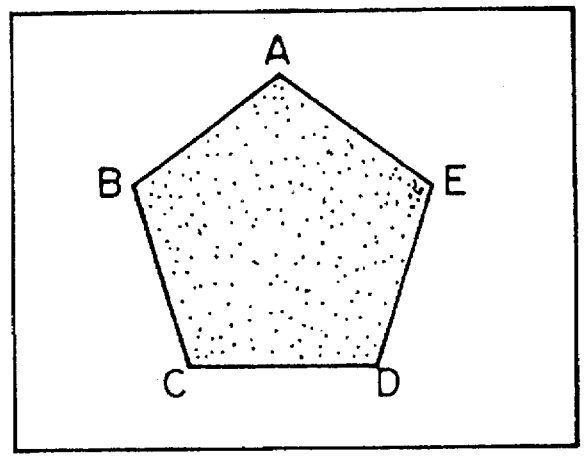
FIG. 3A is a schematic view of a typical polygon processed by the first conventional polygon drawing apparatus.
Figure 3B:
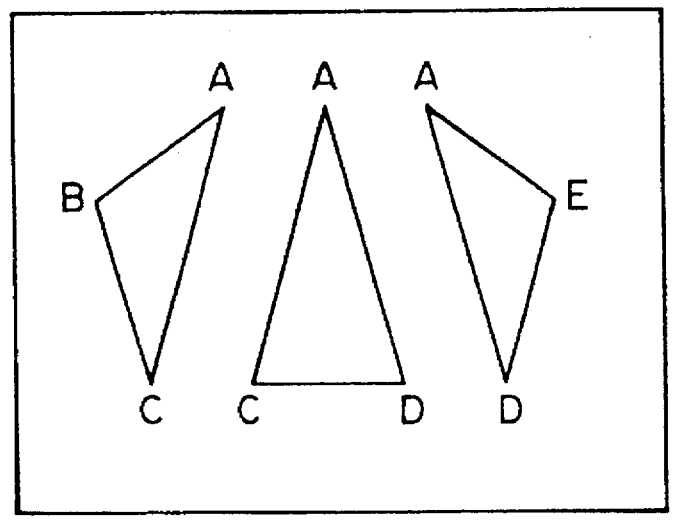
FIG. 3B is a view showing how the polygon of FIG. 3A is divided illustratively into a plurality of triangles.
Figure 4:
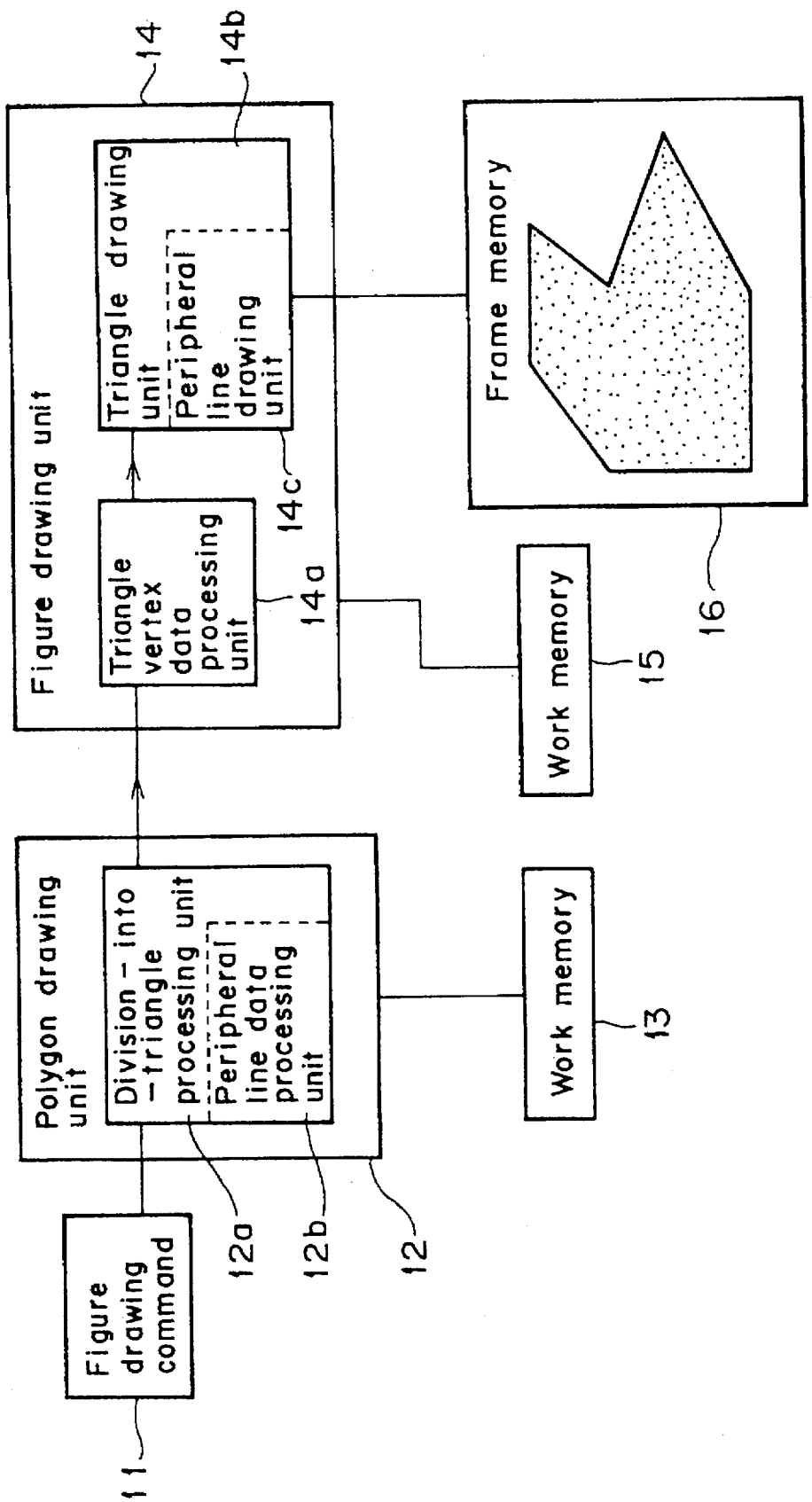
FIG. 4 is a block diagram of a second conventional polygon drawing apparatus.
Figure 6A:
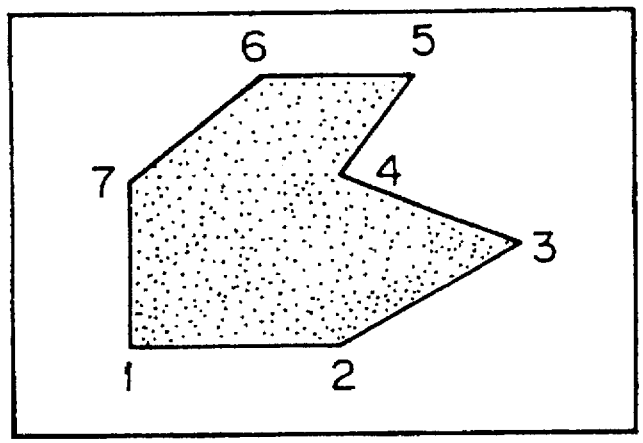
FIG. 6A is a schematic view of a typical polygon processed by the second conventional polygon drawing apparatus.
Figure 6B:
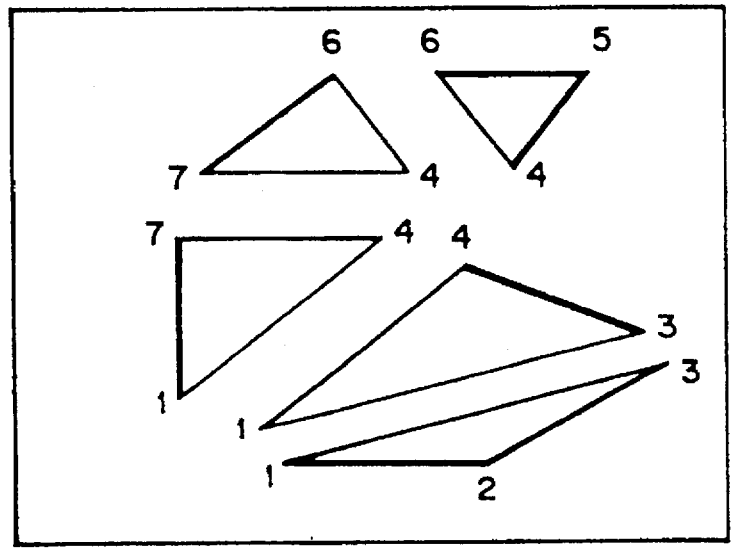
FIG. 6B is a view showing how the polygon of FIG. 6A is divided illustratively into a plurality of triangles.
Figure 7:
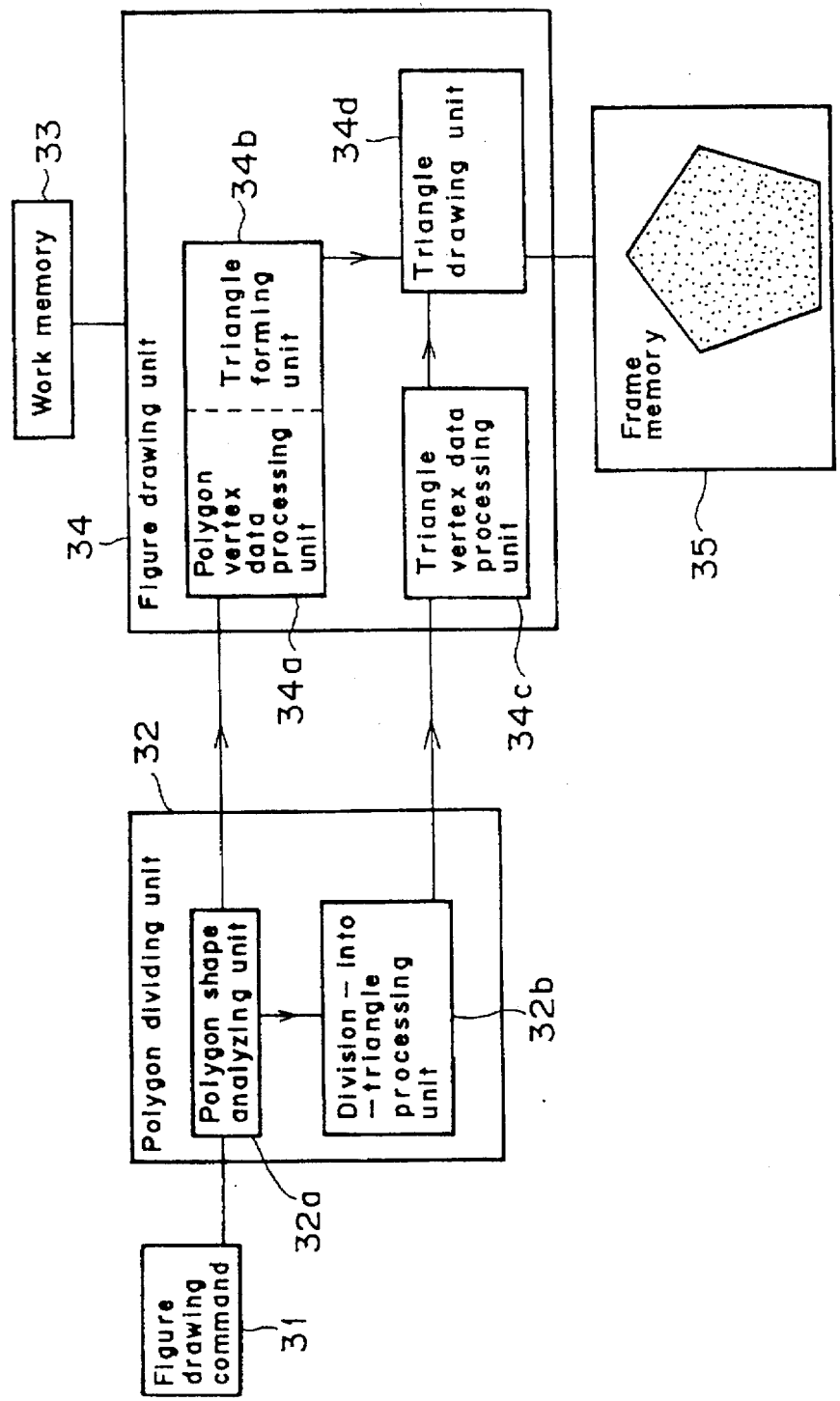
FIG. 7 is an overall block diagram of a polygon drawing apparatus practiced as a first embodiment of the invention.

In FIG. 7, reference numeral 31 is a figure drawing command; 32 is a polygon dividing unit that has a polygon shape analyzing unit 32a and a division-into-triangle processing unit 32b; 33 is a work memory; and 34 is a figure drawing unit that has a polygon vertex data processing unit 34a, a triangle forming unit 34b, a triangle vertex data processing unit 34c and a triangle drawing unit 34d.

Figure 8:
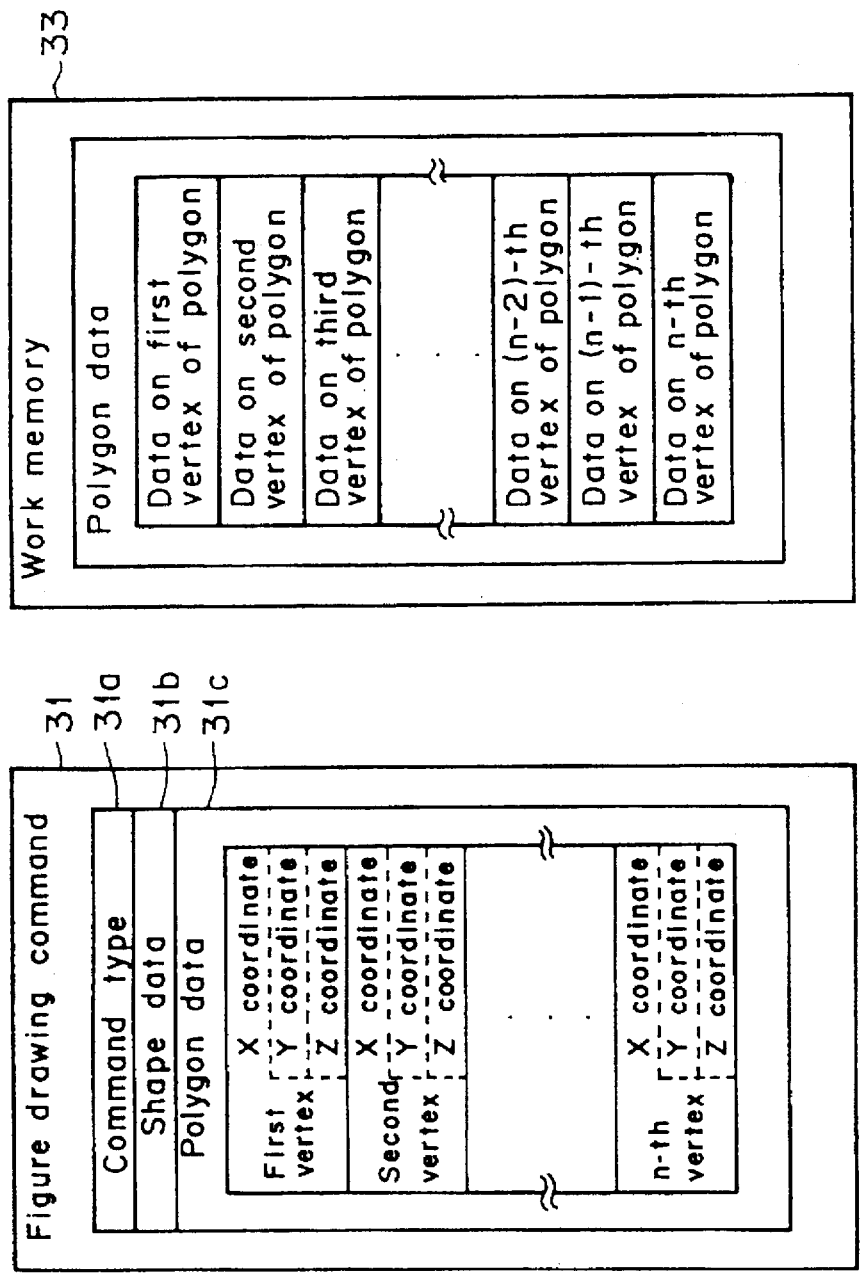
FIG. 8A is a schematic view of a figure drawing command for use with the first embodiment.
FIG. 8B is a schematic view of data arrangements in a work memory of the first embodiment.

The figure drawing command 31 is a body of information that defines the polygon to be drawn in accordance with a protocol such as PEX [PHIGS (Programmer's Hierarchical Interactive Graphics System)/PHIGS PLUS Extensions for X], etc. The command 31 is input from a client such as an application program. The figure drawing command 31 included, as shown in FIG. 8A, a command type 31a (data for distinguishing the command in question from other commands, including data for identifying the target figure as a plane figure or a non-planar figure), shape data 31b (about the shape of the target polygon, including data for defining the polygon as a convex polygon or a non-convex polygon), polygon data 31c (X, Y and Z coordinates of each of the vertices constituting the polygon), vertex colors, designated manner of shading, position and color of a light source, point of view, etc. The figure drawing command 31 is input to the polygon dividing unit 32.

Figure 9:
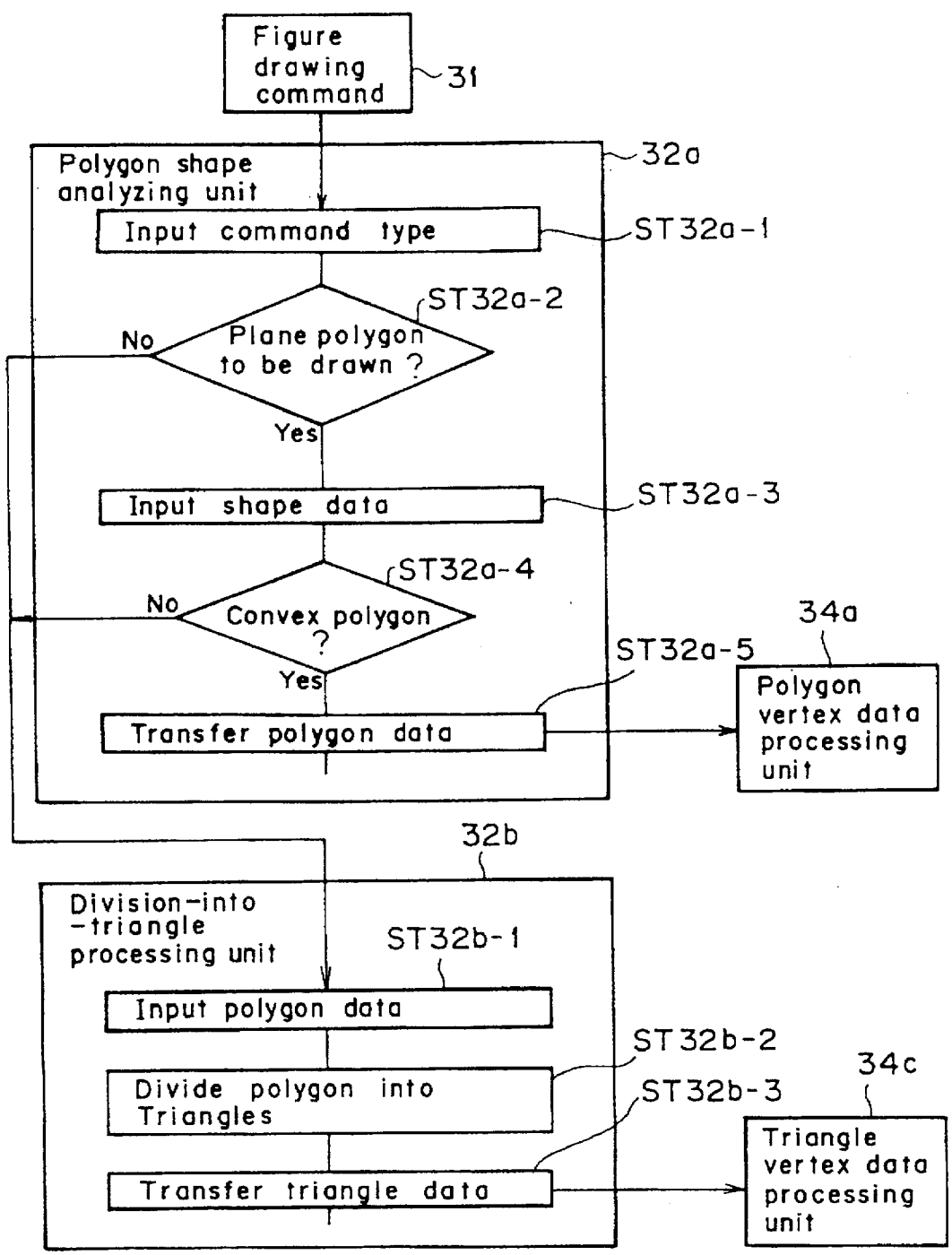
FIG. 9 is a flowchart of steps showing how a polygon dividing unit of the first embodiment works.

In FIG. 9, the command type 31a of the figure drawing command 31 is input to the polygon shape analyzing unit 32a (step 32a-1). The polygon shape analyzing unit 32a judges, based on the command type 31a of the figure drawing command 31, whether the polygon constituted by the polygon data 31c is a plane figure or a non-planar figure (step 32a-2). If the target polygon is judged to be a non-planar figure, the polygon shape analyzing unit 32a passes control to the division-into-triangle processing unit 32b. If the polygon is judged to be a plane figure, the polygon shape analyzing unit 32a receives the shape data 31b of the figure drawing command 31 (step 32a-3). On the basis of the shape data 31b, the polygon shape analyzing unit 32a judges whether the target polygon is a convex polygon or a non-convex polygon (step 32a-4). If the target polygon is judged to be a non-convex polygon, the polygon shape analyzing unit 32a passes control to the division-into-triangle processing unit 32b. If the polygon is judged to be a convex polygon, the polygon shape analyzing unit 32a transfers the polygon data 31c of the figure drawing command 31 and the related data to the polygon vertex data processing unit 34a of the figure drawing unit 34 (step 32a-5). On receiving the polygon data 31c of the figure drawing command 31 (step 32b-1), the division-into-triangle processing unit 32b divides into a plurality of triangles the polygon constituted by the polygon data 31c. The division-into-triangle processing unit 32b then generates polygon vertex data on each of the divided triangles (step 32b-2). After data generation, the division-into-triangle processing unit 32b supplies the triangle vertex data processing unit 34c of the figure drawing unit 34 with the polygon vertex data on each of the divided triangles along with the related data (step 32b-3).

Referring to FIG. 7, the polygon vertex data processing unit 34a receives the polygon data 31c from the polygon shape analyzing unit 32a. The polygon vertex data processing unit 34a then carries out such polygon vertex processing as a face/reverse determining process that determines the orientation of the polygon face (face normal), a coordinate transformation process that transforms the data on the polygon vertices (i.e., coordinates) from the initially defined coordinate system to the coordinate system of the apparatus in question, and color computations for shading. Following the polygon vertex processing, as shown in FIG. 8B, the polygon vertex data processing unit 34a places into the work memory 33 the data on the first through the n-th vertex of the polygon, where n stands for the number of the angles constituting the polygon in question.

Figure 10:
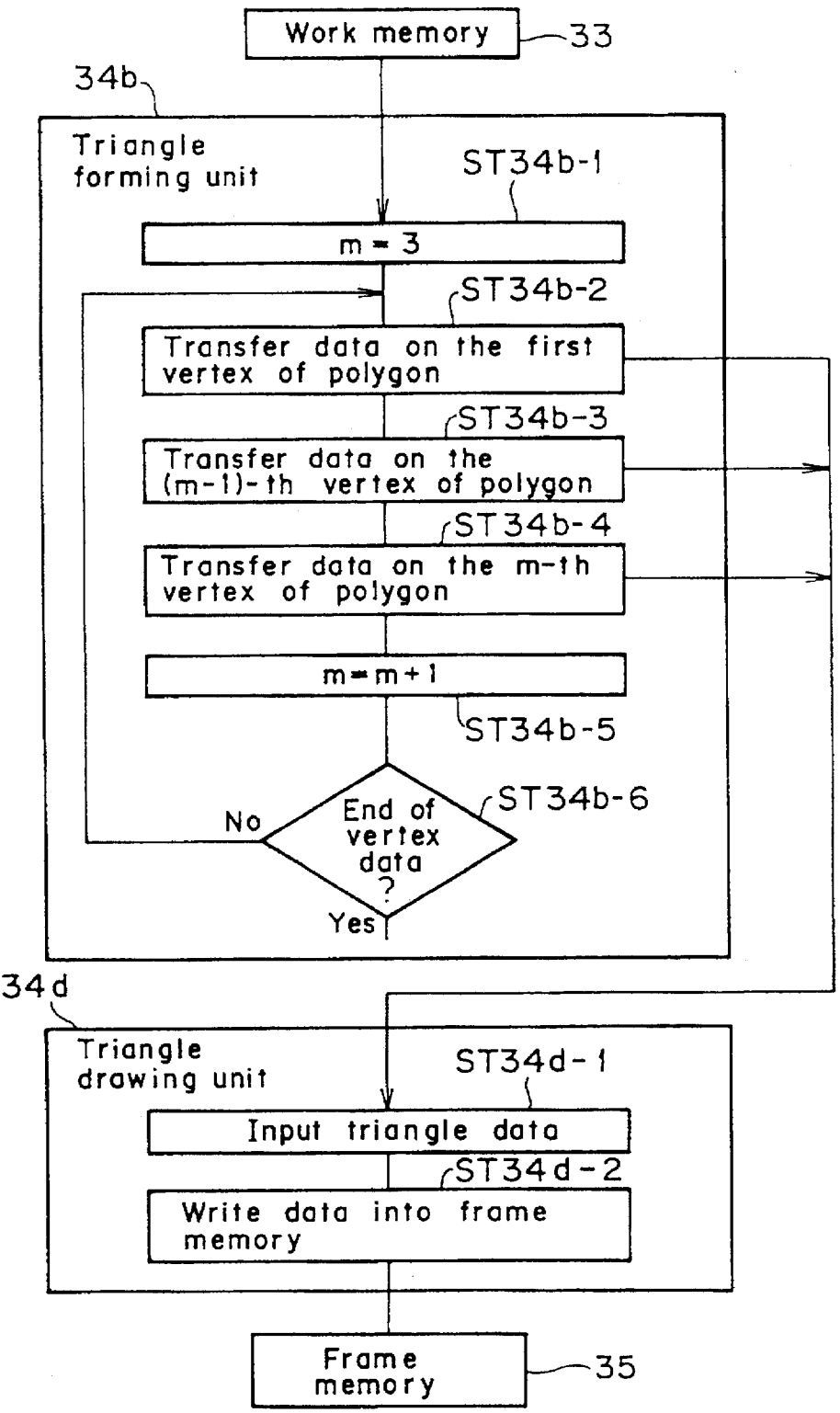
FIG. 10 is a flowchart of steps showing how a figure drawing unit of the first embodiment works.

In FIG. 10, the polygon data placed in the work memory 33 is processed by the triangle forming unit 34b as follows: with a working variable m set at 3 (step 34b-1), the triangle forming unit 34b transfers the data on the first vertex of the polygon, data on the (m−1)-th vertex of the polygon, and the data on the m-th vertex of the polygon to the triangle drawing unit 34d (steps 34b-2, 34b-3, 34b-4). The working variable m is then incremented by 1 (m=m+1, in step 34b-5). A check is made to see if the working variable m has exceeded the number n of the vertices making up the polygon (step 34b-6). If the working variable m has yet to exceed the polygon vertex count n (m≦n), step 34b-2 is reached again, and transfer of the data on the vertices of the polygon is repeated. When the end of the polygon vertex data is reached (m>n), the processing of the triangle forming unit 34b is terminated. The triangle drawing unit 34d receives the data on each of the divided triangles (i.e., data on the respective three vertices of the polygon; step 34d-1). The transferred triangle data is converted successively to raster data before being stored into a frame memory 35 (step 34d-2). After storage into the frame memory 35, the polygon based on the raster data is drawn (i.e., displayed) onto a raster type display unit.

In FIG. 7, the data on each triangle (i.e., data on the respective three vertices of the polygon) transferred from the division-into-triangle processing unit 32b to the figure drawing unit 34 is forwarded to the triangle vertex data processing unit 34c. In turn, the triangle vertex data processing unit 34c performs such triangle data processing as a face/reverse determining process that determines the orientation of the triangle face (face normal), a coordinate transformation process that transforms the triangle vertex data (i.e., coordinates) from the initially defined coordinate system to the coordinate system of the apparatus in question, and color computations for shading. The triangle data processed by the triangle vertex data processing unit 34c is sent as it is processed to the triangle drawing unit 34d. The triangle drawing unit 34d, as described earlier, converts the received triangle data successively into raster data for storage into the frame memory 35.

According to the first embodiment, the polygon shape analyzing unit 32a judges whether the polygon to be processed is a plane figure or a non-planar figure based on the command type 31a of the figure drawing command 31. The polygon shape analyzing unit 32a further judges whether the target polygon is a convex polygon or a non-convex polygon. If the target polygon is found to be a plane figure which is also a convex polygon, the polygon vertex data processing unit 34a carries out such processing as face/reverse determination, coordinate transformation and color computations on that polygon. The processed polygon is then divided by the triangle forming unit 34b into a plurality of triangles. This means that any plane figure which is also a convex polygon undergoes face/reverse determination and color computations only once and is subject to coordinate transformation just once for each of the vertices constituting the polygon. Furthermore, there occur less quantities of vertex data to be transferred from the polygon dividing unit 32 to the figure drawing unit 34 if the target polygon is at once a plane figure and a convex polygon. With the loads of such processing as face/reverse determination, coordinate transformation, color computations and data transfer thus alleviated, the polygon drawing process is carried out rapidly and efficiently.

In FIG. 9, it should be noted that the polygon shape analyzing unit 32a judges, based on the shape data 31b of the figure drawing command 31, whether the target polygon is a convex polygon or a non-convex polygon, and that the polygon shape analyzing unit 32a passes control to the polygon vertex data processing unit 34a of the figure drawing unit 34 only when the polygon is found to be a convex polygon. The arrangement is intended to reduce the processing overhead because non-convex polygons would require more complex processing by the triangle forming unit 34b than convex polygons. It is thus evident that a polygon which is at once a plane figure and a non-convex polygon may also be processed alternatively by way of the polygon vertex data processing unit 34a.

Second Embodiment

Figure 11:
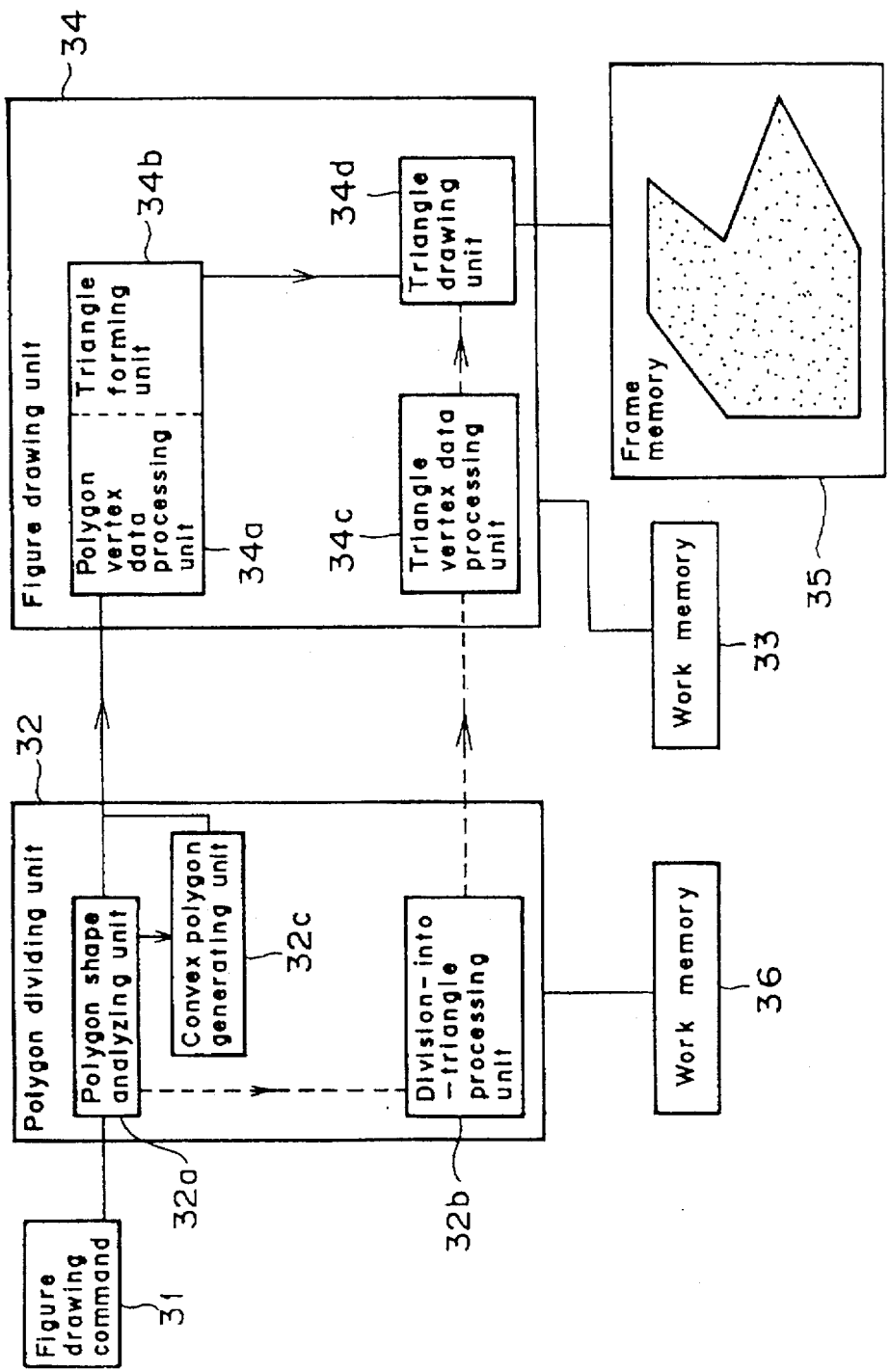
FIG. 11 is an overall block diagram of a polygon drawing apparatus practiced as a second embodiment of the invention.
Figure 13:
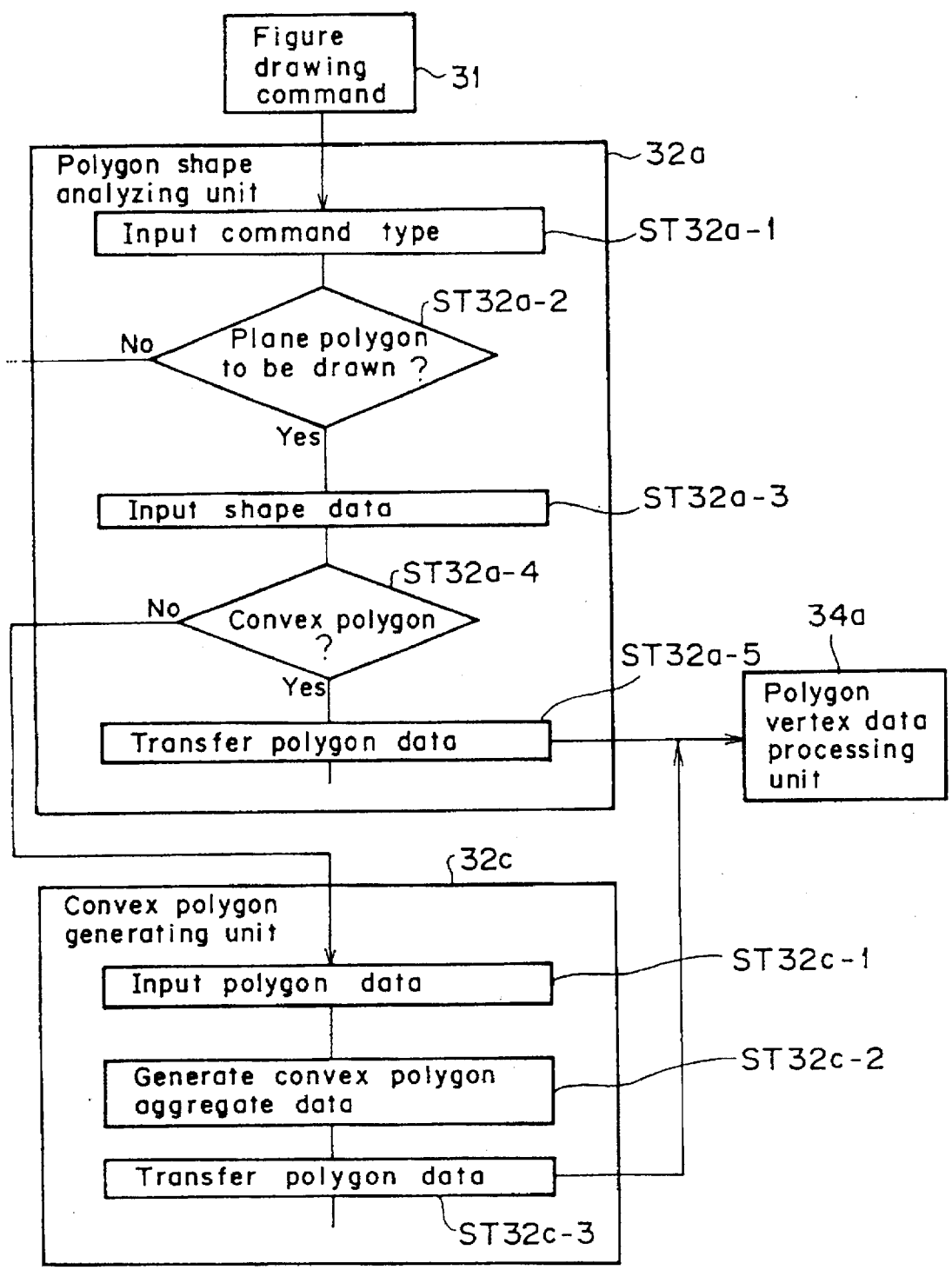
FIG. 13 is a flowchart of steps showing how a polygon dividing unit of the second embodiment works.

In describing the second embodiment, the parts that are substantially the same in function as those already described in connection with the first embodiment will be designated by the same reference numerals, and the descriptions of such parts will be partly omitted. The second embodiment is an improvement over the first embodiment. As shown in FIG. 11, the polygon dividing unit 32 further includes a convex polygon generating unit 32c. Referring to FIG. 13, if the polygon shape analyzing unit 32a of the second embodiment judges that the polygon to be processed is at once a plane figure and a non-convex polygon (steps 32a-1 through 32a-4), control is passed on to the convex polygon generating unit 32c instead of to the division-into-triangle processing unit 32b as in the case of the first embodiment. That is, in FIG. 13, the convex polygon generating unit 32c receives the data on the non-convex polygon from the polygon shape analyzing unit 32a (step 32c-1). The convex polygon generating unit 32c then divides the non-convex polygon into a plurality of convex polygons (including triangles) to generate convex polygon aggregate data (step 32c-2). The convex polygon aggregate data are made up of a plurality of polygon vertex data on each of the divided convex polygons and are stored into a work memory 36 shown in FIG. 11. The manner of dividing a non-convex polygon into a plurality of convex polygons may be any one of known techniques in the art.

Figure 12C:
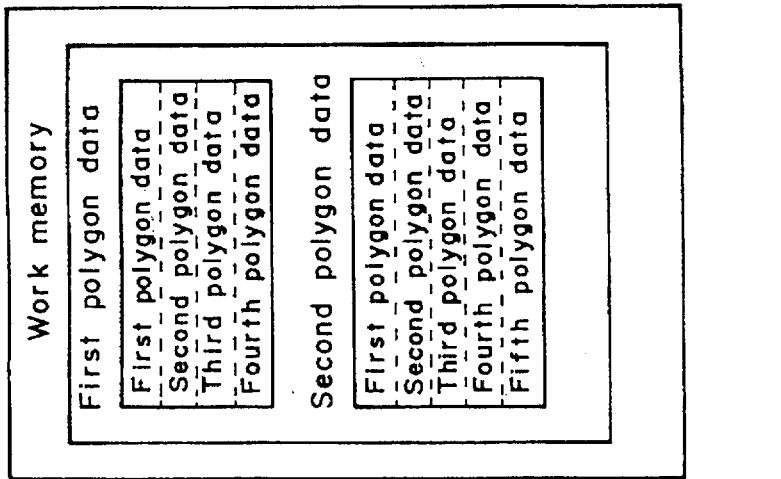
FIGS. 12B and 12C are schematic views of data arrangements in work memories of the second embodiment.
Figure 12B:
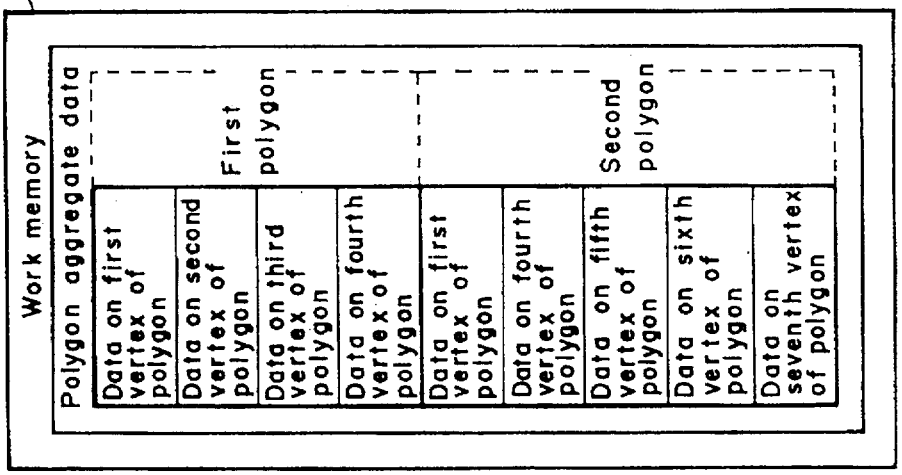
Figure 12A:
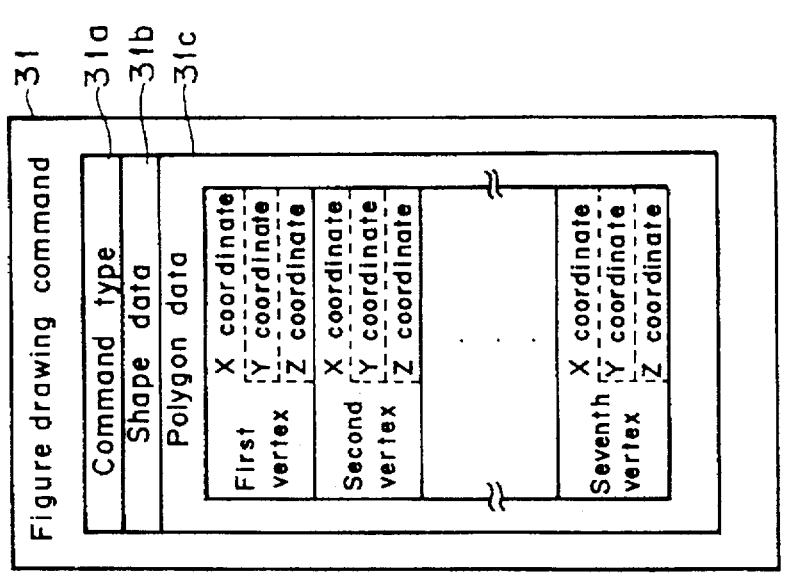
FIG. 12A is a schematic view of a figure drawing command for use with the second embodiment.
Figure 14A:
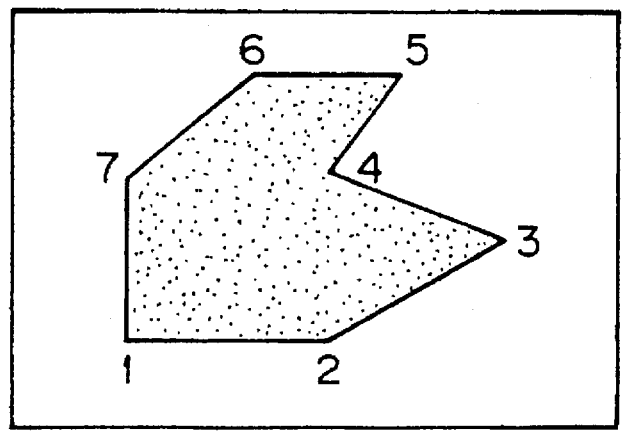
FIG. 14A is a schematic view of a typical polygon processed by the second embodiment.
Figure 14B:
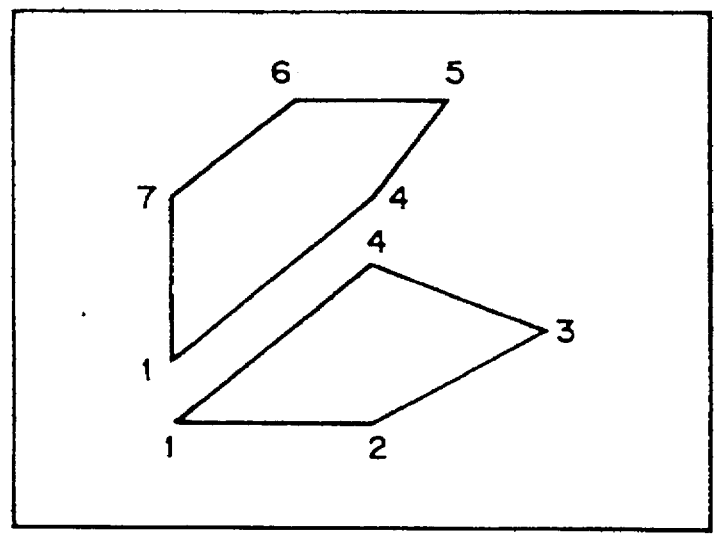
FIG. 14B is a view showing how a convex polygon generating unit of the second embodiment divides the polygon of FIG. 14A illustratively into a plurality of polygons.

For example, suppose that the figure drawing command 31 of FIG. 12A is input and that the figure represented by that command is a non-convex heptagon having vertices 1 through 7, as illustrated in FIG. 14A. In that case, the non-convex heptagon is divided into a first polygon made of vertices 1, 2, 3 and 4, and a second polygon with vertices 1, 4, 5, 6 and 7. The convex polygon generating unit 32c then generates polygon aggregate data made of a plurality of polygon vertex data about each of the first and the second divided polygon, as depicted in FIG. 12B. The polygon aggregate data thus generated are placed into the work memory 36. The convex polygon generating unit 32c transfers the polygon aggregate data along with the related data of the figure drawing command 31 to the polygon vertex data processing unit 34a of the figure drawing unit 34. On receiving the transferred polygon aggregate data, the polygon vertex data processing unit 34a carries out the necessary polygon vertex data processing thereon. The polygon data that are set in the work memory 33 in this example are shown in FIG. 12C. The other processing steps are the same as those of the first embodiment.

The first embodiment has its division-into-triangle processing unit 32b deal with the target polygon conventionally if that polygon is at once a plane figure and a non-convex polygon. By contrast, the second embodiment has its convex polygon generating unit 32c divide into a plurality of convex polygons the target polygon that is both a plane figure and a non-convex polygon, before the unit 32c passes control to the polygon vertex data processing unit 34a. This arrangement alleviates undue burdens off the subsequent processing by the triangle forming unit 34b, whereby the target polygon which is at once a plane figure and a non-convex polygon is processed in a highly efficient manner.

Third Embodiment

Figure 15:
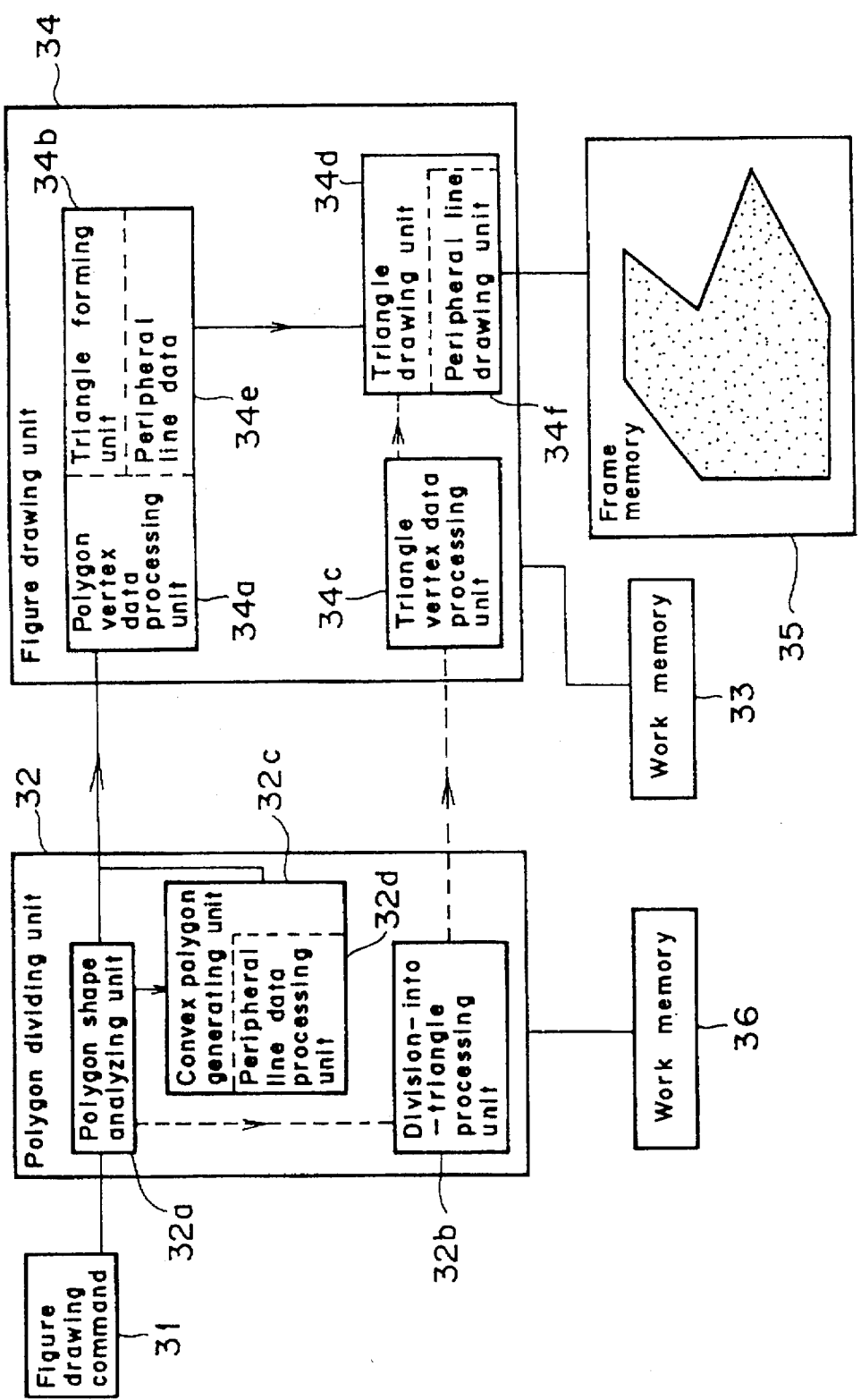
FIG. 15 is an overall block diagram of a polygon drawing apparatus practiced as a third embodiment of the invention.
Figure 16A:
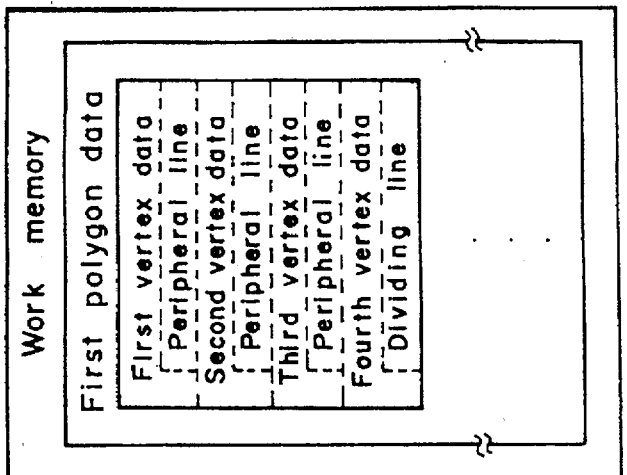
FIG. 16A is a schematic view of a figure drawing command for use with the third embodiment.
Figure 16B:
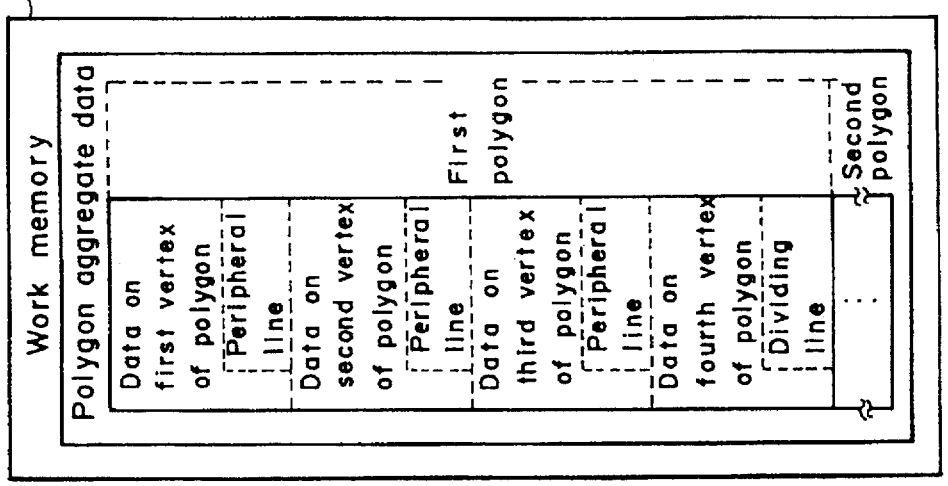
FIGS. 16B and 16C are schematic views of data arrangements in work memories of the third embodiment.
Figure 17A:
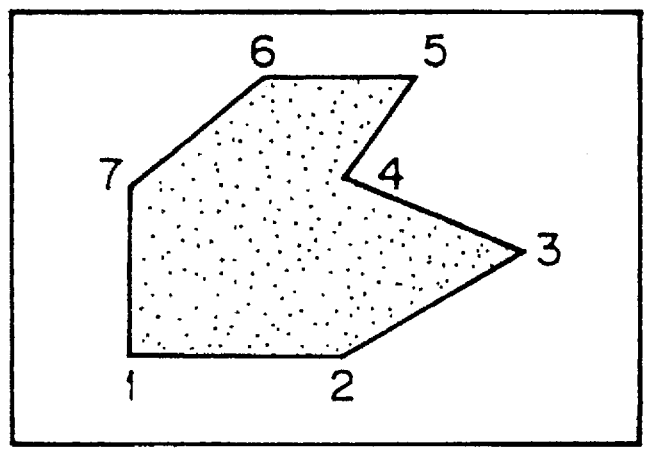
FIG. 17A is a schematic view of a typical polygon processed by the third embodiment.
Figure 17B:
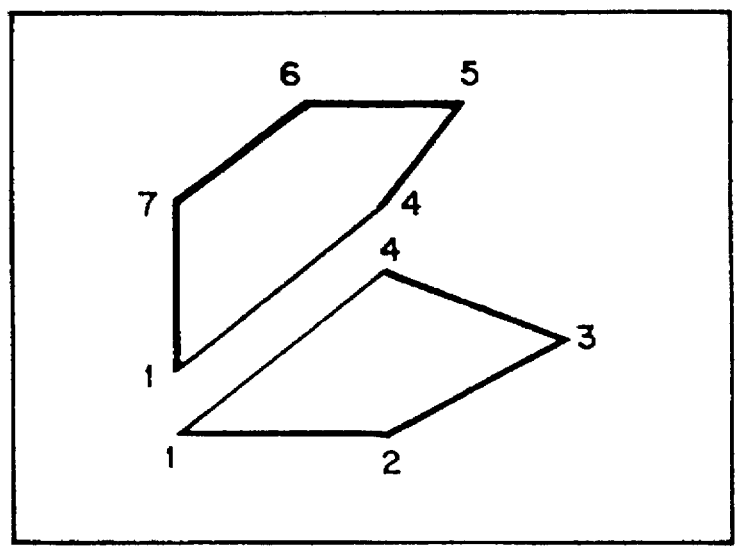
FIG. 17B is a view showing how a convex polygon generating unit of the third embodiment divides the polygon of FIG. 17A illustratively into a plurality of polygons.

In describing the third embodiment, the parts that are substantially the same in function as those already described in connection with the first and the second embodiment will be designated by the same reference numerals, and the descriptions of such parts will be partly omitted. The third embodiment is an improvement over the second embodiment and is arranged to draw polygons having peripheral lines. In the example of FIG. 16A, the figure drawing command 31 has the X, Y and Z coordinates of each vertex in the polygon data 31c supplemented by peripheral line data about the vertex in question. The polygon dividing unit 32 additionally includes a peripheral line data processing unit 32d, as shown in FIG. 15. When the convex polygon generating unit 32c divides a non-convex polygon into a plurality of convex polygons, the peripheral line data processing unit 32d supplements the data on each polygon vertex with peripheral line data indicating whether the side represented by the vertex in question.(e.g., a first vertex may represent the side connecting the first vertex with the second) is a peripheral line (a side constituting part of the periphery of the target polygon) or a dividing line (a side created by division). For example, suppose that the polygon to be processed is a non-convex heptagon having vertices 1 through 7 as shown in FIG. 17A. In that case, the heptagon is divided into a first convex polygon made of vertices 1, 2, 3 and 4, and a second convex polygon including vertices 1, 4, 5, 6 and 7, as shown in FIG. 17B. On each of the first and the second convex polygon, the peripheral line data processing unit 32d generates polygon data constituted by the data about a plurality of polygon vertices. As depicted in FIG. 16B, the respective polygon vertex data are each supplemented by peripheral line data before being stored into the work memory 36.

Figure 16C:
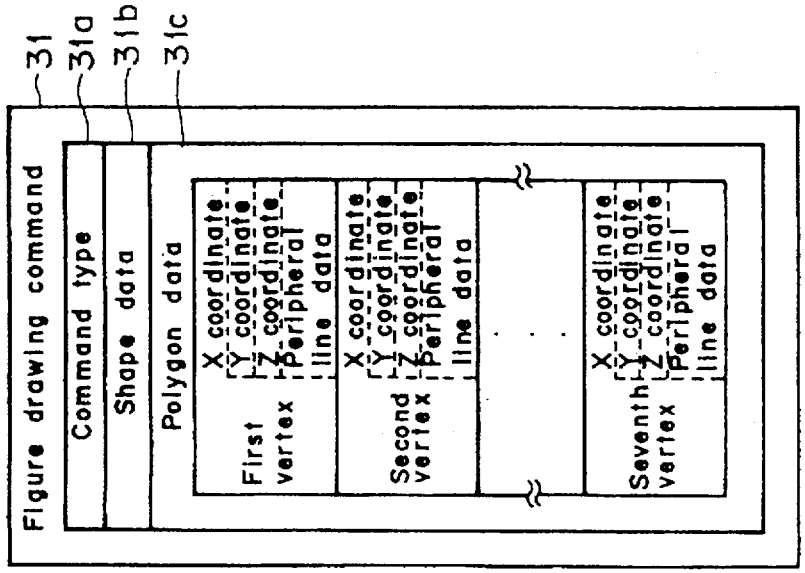

In FIG. 15, the figure drawing unit 34 additionally includes a peripheral line data processing unit 34e and a peripheral line drawing unit 34f. When the polygon vertex data processing unit 34a performs its polygon vertex data processing, the peripheral line data processing unit 34e supplements the data on each vertex with peripheral line data, and places the supplemented data into the work memory 33 as shown in FIG. 16C. Furthermore, when the triangle forming unit 34b divides the target polygon into a plurality of triangles, the peripheral line data processing unit 34e supplements the data on each vertex with peripheral line data, and transfers the supplemented data to the triangle drawing unit 34d. The peripheral line drawing unit 34f draws the peripheral lines of the target polygon based on the peripheral line data attached to the triangle data received. The other processing steps are the same as those of the first and the second embodiment. Constituted as described, the third embodiment draws polygons having peripheral lines as efficiently as the first or the second embodiment.

As many apparently different embodiments of this invention may be made without departing from the spirit and scope thereof, it is to be understood that the invention is not limited to the specific embodiments thereof except as defined in the appended claims.

What is claimed is:

1. A polygon drawing apparatus for admitting a figure drawing command including command type data and vertex data defining a polygon to be drawn and for outputting raster data about said polygon, said polygon drawing apparatus comprising:

polygon shape analyzing means for judging, based on said command type data of said figure drawing command, whether said polygon constituted by said vertex data of said figure drawing command is a plane figure or a non-planar figure;

division-into-triangle processing means for dividing said polygon into a plurality of triangles when said polygon shape analyzing means judges that said polygon is a non-planar figure and for generating vertex data about each of the divided triangles;

triangle vertex data processing means for performing vertex data processing on each of said divided triangles constituted by said vertex data generated by said division-into-triangle processing means;

polygon vertex data processing means for performing the vertex data processing on said polygon when said polygon shape analyzing means judges that said polygon is a plane figure;

triangle forming means for dividing into a plurality of triangles the polygon constituted by the vertex data processed by said polygon vertex data processing means and for generating vertex data about each of the divided triangles; and triangle drawing means for successively transforming into raster data each of the triangles constituted by one of two kinds of vertex data, one kind of vertex data having been processed by said triangle vertex data processing means, the other kind of vertex data having been generated by said triangle forming means.

2. A polygon drawing apparatus according to claim 1, wherein said polygon shape analyzing means judges, based on shape data included in said figure drawing command, whether said polygon constituted by said vertex data of said figure drawing command is a convex polygon or a non-convex polygon, and wherein said polygon vertex data processing means performs the vertex data processing on said polygon only when said polygon shape analyzing means judges that said polygon is a plane figure which is also a convex polygon.

3. A polygon drawing apparatus according to claim 2, further comprising convex polygon generating means for dividing a non-convex polygon into a plurality of convex polygons and for generating vertex data about each of the divided convex polygons, and wherein, if said polygon shape analyzing means judges that said polygon is a plane figure which is also a non-convex polygon, said convex polygon generating means divides said non-convex polygon into a plurality of convex polygons, the division of said non-convex polygon being followed by said polygon vertex data processing means performing the vertex data processing on each of the divided convex polygons.

4. A polygon drawing apparatus according to claim 3, wherein said convex polygon generating means supplements said vertex data defining each side of the divided convex polygons by peripheral line data indicating whether the side in question constitutes part of the periphery of the original polygon or is a side created by division, wherein said triangle forming means supplements said vertex data defining each side of the divided triangles by peripheral line data indicating whether the side in question constitutes part of the periphery of said original polygon or is a side created by division, and wherein said triangle drawing means processes the peripheral lines of said original polygon based on said peripheral line data added to said vertex data by said triangle forming means.

* * * * *